United States Patent
Siswick et al.

(10) Patent No.: US 9,764,713 B2
(45) Date of Patent: Sep. 19, 2017

(54) PROVISION OF A STATUS INDICATION TO A USER IN A VEHICLE COMMUNICATION SYSTEM

(71) Applicant: Jaguar Land Rover Limited, Coventry (GB)

(72) Inventors: Howard Siswick, Coventry (GB); Mohammed Khan, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/894,528

(22) PCT Filed: Jun. 2, 2014

(86) PCT No.: PCT/EP2014/061401
§ 371 (c)(1),
(2) Date: Nov. 29, 2015

(87) PCT Pub. No.: WO2014/191582
PCT Pub. Date: Dec. 4, 2014

(65) Prior Publication Data
US 2016/0107611 A1    Apr. 21, 2016

(30) Foreign Application Priority Data
May 31, 2013 (GB) .................................. 1309743.1

(51) Int. Cl.
*B60Q 1/00* (2006.01)
*B60R 25/24* (2013.01)
(Continued)

(52) U.S. Cl.
CPC .......... *B60R 25/24* (2013.01); *G07C 9/00309* (2013.01); *H04L 67/125* (2013.01);
(Continued)

(58) Field of Classification Search
CPC ................ B60R 25/24; G07C 9/00309; G07C 2009/00555; G07C 2209/63;
(Continued)

(56) References Cited

U.S. PATENT DOCUMENTS

| 5,417,312 A | 5/1995 | Tsuchitani et al. |
| 5,561,331 A | 10/1996 | Suyama et al. |

(Continued)

FOREIGN PATENT DOCUMENTS

| CN | 1394253 A | 1/2003 |
| CN | 201893808 U | 7/2011 |

(Continued)

OTHER PUBLICATIONS

Combined Search and Examination Report, GB 1309743.1, Nov. 29, 2013, 7 pages.
(Continued)

*Primary Examiner* — Erin File
(74) *Attorney, Agent, or Firm* — Myers Bigel, P.A.

(57) ABSTRACT

A vehicle communication system (100) comprises a base station (104) positioned in the vehicle (102) and a mobile communication unit (122). The base station (104) comprises a first transmitter for transmitting a signal to the mobile communication unit (122) and a first receiver for receiving an authentication signal from the mobile communication unit (122). The base station (104) is configured to track a position of the mobile communication unit with respect to the vehicle based on a time of flight of a communication between the mobile communication unit and at least the first transmitter and the first receiver, to receive a subsystem status signal relating to performance of a monitored vehicle (102) function and to determine, based on the subsystem status signal, a monitored function status relating to the monitored vehicle (102) function. The base station (104) is (Continued)

also configured to output a status update signal for receipt by the mobile communication unit (122), the status update signal being indicative of the monitored function status. The vehicle communication system (100) is configured to provide a status indication to a user based on the status update signal in dependence on the position of the mobile communication unit (122).

14 Claims, 6 Drawing Sheets

(51) Int. Cl.
    *H04L 29/08*     (2006.01)
    *G07C 9/00*     (2006.01)
    *H04W 4/04*     (2009.01)
    *H04W 4/02*     (2009.01)

(52) U.S. Cl.
    CPC .. *H04W 4/046* (2013.01); *G07C 2009/00555* (2013.01); *G07C 2209/62* (2013.01); *G07C 2209/63* (2013.01); *H04L 67/12* (2013.01); *H04W 4/023* (2013.01); *H04W 4/028* (2013.01)

(58) Field of Classification Search
    CPC .. G07C 2209/62; H04W 4/046; H04W 4/028; H04W 4/023; H04L 67/125; H04L 67/12
    See application file for complete search history.

(56) References Cited

U.S. PATENT DOCUMENTS

| | | | |
|---|---|---|---|
| 6,034,617 A | 3/2000 | Luebke et al. | |
| 6,236,333 B1 | 5/2001 | King | |
| 6,259,362 B1 | 7/2001 | Lin | |
| 7,844,377 B2 | 11/2010 | Oota et al. | |
| 8,761,603 B1 | 6/2014 | Maleki | |
| 9,193,331 B2 | 11/2015 | Endo | |
| 9,220,078 B1* | 12/2015 | Bietz | H04W 64/00 |
| 2001/0038328 A1 | 11/2001 | King et al. | |
| 2002/0109587 A1 | 8/2002 | Attring et al. | |
| 2003/0181169 A1 | 9/2003 | Mutoh | |
| 2006/0077042 A1 | 4/2006 | Hock | |
| 2006/0091997 A1 | 5/2006 | Conner et al. | |
| 2007/0024121 A1 | 2/2007 | Teshima et al. | |
| 2007/0024416 A1 | 2/2007 | Tang et al. | |
| 2007/0038344 A1 | 2/2007 | Oota et al. | |
| 2007/0085658 A1 | 4/2007 | King et al. | |
| 2008/0284564 A1 | 11/2008 | Leitch | |
| 2009/0146846 A1 | 6/2009 | Grossman | |
| 2009/0289759 A1 | 11/2009 | Tsuchiya et al. | |
| 2010/0052931 A1 | 3/2010 | Kolpasky et al. | |
| 2010/0075656 A1* | 3/2010 | Howarter | B60R 25/2009 455/420 |
| 2010/0076622 A1 | 3/2010 | Dickerhoof et al. | |
| 2010/0138079 A1 | 6/2010 | Ögren | |
| 2010/0245038 A1 | 9/2010 | Ghabra et al. | |
| 2010/0271171 A1 | 10/2010 | Sampei | |
| 2011/0156885 A1 | 6/2011 | Baek et al. | |
| 2011/0224870 A1 | 9/2011 | Tan | |
| 2012/0044974 A1 | 2/2012 | Mukai et al. | |
| 2012/0092129 A1 | 4/2012 | Lickfelt | |
| 2012/0129545 A1 | 5/2012 | Hodis et al. | |
| 2012/0158214 A1 | 6/2012 | Talty et al. | |
| 2012/0262340 A1 | 10/2012 | Hassan et al. | |
| 2012/0268242 A1 | 10/2012 | Tieman et al. | |
| 2013/0054095 A1 | 2/2013 | Suzuki et al. | |
| 2013/0143594 A1 | 6/2013 | Ghabra et al. | |
| 2013/0171995 A1 | 7/2013 | Fujishiro et al. | |
| 2013/0342379 A1 | 12/2013 | Bauman et al. | |
| 2015/0080021 A1* | 3/2015 | Bietz | H04B 1/3877 455/456.1 |
| 2015/0168174 A1* | 6/2015 | Abramson | G01C 21/3697 701/408 |
| 2016/0059827 A1 | 3/2016 | Uddin et al. | |
| 2016/0182548 A1 | 6/2016 | Ghabra et al. | |

FOREIGN PATENT DOCUMENTS

| | | |
|---|---|---|
| CN | 102582537 A | 7/2012 |
| CN | 102747893 | 10/2012 |
| CN | 103946899 A | 7/2014 |
| DE | 10 2006 037 237 A1 | 2/2008 |
| DE | 20 2010 017 197 U1 | 10/2011 |
| EP | 1 143 089 A2 | 10/2001 |
| EP | 1 447 775 A2 | 8/2004 |
| EP | 1 916 162 A2 | 4/2008 |
| GB | 2 335 002 A | 9/1999 |
| GB | 2 496 755 A | 5/2013 |
| GB | 2496755 A | 6/2013 |
| JP | 2003-278418 A | 10/2003 |
| JP | 2004-308165 A | 11/2004 |
| JP | 2006-009200 A | 1/2005 |
| JP | 2007-039922 A | 2/2007 |
| JP | 2007-049561 A | 2/2007 |
| JP | 2008-255750 A | 10/2008 |
| JP | 2009-038745 | 2/2009 |
| JP | 2010-053632 A | 3/2010 |
| JP | 2010-160017 | 7/2010 |
| JP | 2010-173384 | 8/2010 |
| JP | 2010-0276594 A | 12/2010 |
| JP | 2011-025715 A | 2/2011 |
| JP | 2011-184963 A | 9/2011 |
| JP | 2012-060609 A | 3/2012 |
| JP | 2012-149474 A | 8/2012 |
| JP | 2013-044887 A | 3/2013 |
| WO | WO 02/38895 A1 | 5/2002 |
| WO | WO 2007/010371 A1 | 1/2007 |
| WO | WO 2007/073969 A1 | 7/2007 |
| WO | WO 2012/084111 A1 | 6/2012 |
| WO | WO 2013/072489 A1 | 5/2013 |

OTHER PUBLICATIONS

Combined Search and Examination Report, GB 1309744.9, Nov. 29, 2013, 7 pages.
Combined Search and Examination Report, GB 1309748.0, Dec. 6, 2013, 6 pages.
Combined Search and Examination Report, GB 1409778.6, Nov. 28, 2014, 6 pages.
Combined Search and Examination Report, GB 1409725.7, Dec. 2, 2014, 5 pages.
Examination Report, GB 1309747.2, Jun. 4, 2015, 2 pages.
Examination Report, GB 1309745.6, Jun. 4, 2015, 2 pages.
Examination Report, GB 1309748.0, Oct. 9, 2015, 3 pages.
Notification of Transmittal of the International Search Report and the Written Opinion of the International Searching Authority, or the Declaration, PCT/EP2014/061208, Jul. 16, 2014, 12 pages.
Notification of Transmittal of the International Search Report and the Written Opinion of the International Searching Authority, or the Declaration, PCT/EP2014/061210, Sep. 2, 2014, 12 pages.
Notification of Transmittal of the International Search Report and the Written Opinion of the International Searching Authority, or the Declaration, PCT/EP2014/061336, Sep. 2, 2014, 14 pages.
Notification of Transmittal of the International Search Report and the Written Opinion of the International Searching Authority, or the Declaration, PCT/EP2014/061401, Sep. 2, 2014, 14 pages.
Notification of Transmittal of the International Search Report and the Written Opinion of the International Searching Authority, or the Declaration, PCT/EP2014/061252, Aug. 28, 2014, 13 pages.
Search Report, GB 1309745.6, Dec. 4, 2013, 5 pages.
Search Report, GB 1309747.2, Dec. 6, 2013, 4 pages.
Notice of Reasons for Rejection, Japanese Patent Application No. 2016-516185, Jan. 10, 2017, 6 pages.
Notification of Reasons for Refusal, Japanese Patent Application No. 2016-516178, Jan. 24, 2017, 6 pages.

(56) References Cited

OTHER PUBLICATIONS

Notice of Reasons for Rejection, Japanese Patent Application No. 2016-516197, Dec. 6, 2016, 8 pages.
Notificaiton of First Office Action, Chinese Patent Application No. 201480031199.2, Nov. 16, 2016, 21 pages.
Notice of Reasons for Rejection, Japanese Application No. 2016-516177, Jan. 4, 2017.
Notificatin of First Office Action, Chinese Patent Application No. 201480031134.8, Nov. 2, 2016, 14 pages.
Notice of Reasons for Refusal, Japanese Application No. 2016-516200, Jan. 4, 2017.

* cited by examiner

the contents of which are incorporated herein by reference …

PROVISION OF A STATUS INDICATION TO A USER IN A VEHICLE COMMUNICATION SYSTEM

RELATED APPLICATIONS

This application is a 35 U.S.C. §371 national stage application of PCT Application No. PCT/EP2014/061401, filed on Jun. 2, 2014, which claims priority from Great Britain Patent Application No. 1309743.1, filed on May 31, 2013, the contents of which are incorporated herein by reference in their entireties. The above-referenced PCT International Application was published in the English language as International Publication No. WO 2014/191582 A1 on Dec. 4, 2014.

TECHNICAL FIELD

The present invention relates to a vehicle communication system for facilitating control over vehicle functions. The present invention relates more particularly, but not exclusively, to systems and methods for facilitating control over vehicle functions and providing vehicle status information to a user via a mobile communication unit.

BACKGROUND OF THE INVENTION

In today's world, many vehicles are equipped with systems for facilitating remotely controlled vehicle functions such as passive entry and passive starting (i.e., PEPS) of a host vehicle. When a vehicle is equipped with a PEPS system, a user may carry a mobile communication unit which can communicate with a base station located in the vehicle. To initiate communication the base station may emit a relatively powerful Low Frequency (LF) electromagnetic field, causing a mobile communication unit that is sufficiently close to the base station to awaken. Once the mobile communication unit is awake, it may use Radio Frequency (RF) transmissions to dispatch signals, which may be validated by the base station. If the base station recognizes and approves the identity of the mobile communication unit, (i.e., the base station authenticates the mobile communication unit), the base station may facilitate the performance of a predefined vehicle function, such as actuating a door lock mechanism, causing the door to become unlocked. In such passive systems, the functions may be performed based solely on the position, or changes in the position, of the mobile communication unit, and the functions may be performed even though no specific command may have been initiated by the user.

For example, in some passive systems, an approach of the mobile communication unit toward the vehicle may be detected so that a desire for one or more vehicle functions to be performed (e.g., unlocking doors) may be anticipated and automatically provided in a manner that enhances the operator experience. In other passive systems, a departure of the mobile communication unit away from the vehicle may be detected so that one or more other functions (e.g., locking vehicle doors) may be performed.

In addition to the above-described passive communications, a vehicle communication system may also be configured to facilitate active communications among system components. Active communications may include transmissions initiated by a user seeking performance of a predefined function. For example, a user, by pressing a button or actuating a switch on a mobile communication unit, may actively initiate active communications with the vehicle, sending a command to lock or unlock the vehicle doors or to actively start the vehicle engine.

In some vehicle communication systems, the effective operational range for communications between a mobile communication unit and the vehicle may be subject to variation, depending upon a number of variable factors such as the state of battery charge and local environmental conditions. Some conventional systems may have an extended range of operation that exceeds one hundred meters. Such extended ranges of operation may be useful for enabling a user to reliably control vehicle functions in a variety of conditions without the necessity of being closely proximate the vehicle. For example, currently available systems may enable a user to remotely start their vehicle engine or to lock or unlock doors of the vehicle from a remote location such as several stories up in an office building.

In such systems, there may be no limitations on the exercise of control over vehicle functions other than an effective range of communication between the vehicle and the remote communication unit. Such extended ranges of operation are likely to facilitate control over vehicle functions beyond direct line of sight and/or outside of an audible range of the vehicle. Sometimes the user may wish to exercise control over a vehicle function, such as activating the door locks at a long distance from the vehicle and outside of a direct line of sight to the vehicle. There may be little risk of negative consequences associated with enabling some forms of control (e.g., locking the doors) as the harm associated with an inadvertently dispatched signal (unintentional locking of the doors) may be relatively low. Other functions, however, such as remotely opening a vehicle sunroof, may entail more significant negative consequences if requested inadvertently when the vehicle is out of sight of the user.

In a conventional system, a user may be required to rely on personal observation to determine the status of various attributes of the vehicle. For example, if an aperture is open and a user is within eyesight of the vehicle, the user may visually observe that it is open and realize that an attempt to lock the aperture will not be effective in securing the vehicle. Similarly, if an aperture is open and a user is within earshot of the vehicle, and if the ambient level of noise is not excessively high, and if the vehicle is so equipped, then the vehicle may emit an audible tone signalling the failure to secure the vehicle, which tone the user may hear causing the user to realize that the aperture is open and the attempt to secure it ineffective.

Unfortunately, if the user is not within line of sight of the vehicle and, for example, is located in an area of high ambient noise, the user may not receive any indication or otherwise have reason to realize that an intentionally requested action was not performed or that an inadvertently requested action was performed. For example, the user may not have been sufficiently close to the vehicle to hear the vehicle emit its error tone, or the user may not have been able to see a window opening or to hear the engine starting. Accordingly, a user may be left with no means for verifying the status of the vehicle or its functions other than by approaching the vehicle and inspecting it. This can lead to uncertainty about the status of the vehicle.

The present invention attempts to address or ameliorate at least some of the above problems associated with vehicle communication systems.

SUMMARY OF THE INVENTION

In one aspect, the present invention provides a vehicle communication system for facilitating control over a function of a vehicle, the vehicle communication system comprising:
- a base station positioned in the vehicle; and
- a mobile communication unit;
- wherein the base station comprises a first transmitter for transmitting a signal to the mobile communication unit and a first receiver for receiving a signal from the mobile communication unit;
- wherein the base station is configured to:
  - track a position of the mobile communication unit with respect to the vehicle based on a time of flight of a communication between the mobile communication unit and at least the first transmitter and the first receiver;
  - receive a subsystem status signal relating to performance of a monitored vehicle function;
  - determine, based on the subsystem status signal, a monitored function status relating to the monitored vehicle function; and
  - output a status update signal, the status update signal being indicative of the monitored function status;
- wherein the vehicle communication system is configured to provide a status indication to a user based on the status update signal in dependence on the position of the mobile communication unit.

By virtue of tracking the position of the mobile communication unit based on a time of flight communication, a more accurate determination of the position of the mobile communication unit can be made than is the case with systems which rely on received signal strength (RSSI) measurements. Accordingly, the system is able to provide status indications in an improved manner. For example, the improved positional determination enables status indications to be output only when there is a greater certainty that a user intends to leave the vicinity of the vehicle, such as when the mobile communication unit is determined to be travelling away from the vehicle at a particular threshold distance. At the same time, the provision of unnecessary status indications may be minimised, e.g. if the mobile communication unit (and therefore the user) are determined to be moving in the vicinity of the vehicle, even if moving away from it.

The base station may be configured to provide a status indication to a user based on the status update signal.

The base station may be configured to transmit the status update signal for receipt by the mobile communication unit; wherein the mobile communication unit is configured to:
- receive the status update signal; and
- provide a status indication to a user based on the status update signal.

By virtue of the accurate positional determination of the mobile communication unit, it is possible for a status indication to be provided to the user via a status update signal sent to the mobile communication unit, i.e. when the mobile communication unit is determined to be at a distance from the vehicle at which a status indication is required to be provided, but at which distance two-way communication between the base station and the mobile communication unit is still possible (the mobile communication is not out of range).

The base station may be configured to receive a request from the mobile communication unit, wherein the request seeks performance of a requested vehicle function comprising the monitored vehicle function; and wherein the status update signal is indicative of a status of the requested vehicle function.

The subsystem status signal may be based on a position of the mobile communication unit relative to the vehicle.

The performance of the requested vehicle function may be based on a position of the mobile communication unit relative to the vehicle. The performance of the requested vehicle function may be based on a position of the mobile communication unit relative to an authorisation zone of the vehicle. For example, when the mobile communication unit moves outside of an authorisation zone of the vehicle (i.e. is determined to be over a threshold distance from the vehicle), it may issue a request for the vehicle doors to be locked. In the event that a mis-lock occurs (e.g. if one of the vehicle doors has been left open and therefore cannot be locked), the accuracy with which the position of the mobile communication unit can be determined can allow the status update signal to be sent to the mobile communication unit while it is still within communication range of the base station, so that the user can be alerted to the mis-lock via the mobile communication unit, even if the user has moved out of sight of the vehicle, or if they are simple facing away from it.

The performance of the requested vehicle function may be based on an absolute location of the vehicle. The absolute location of the vehicle may be based on a global positioning system.

The requested vehicle function may comprise locking a vehicle aperture. The requested vehicle function may comprise closing a vehicle aperture. The requested vehicle function may comprise starting a vehicle engine. The requested vehicle function may comprise controlling a vehicle lighting system.

The base station may be configured to provide the status indication by causing the vehicle to emit light and/or sound.

The mobile communication unit may be configured to provide the status indication by emitting light. The mobile communication unit may be configured to provide the status indication by emitting sound. The mobile communication unit may be configured to provide the status indication by vibrating.

The base station may be configured to track the location of the mobile communication unit based on a time of flight of an ultra-wideband communication between the mobile communication unit and three or more transceivers positioned in the vehicle.

In another aspect, the present invention provides a method for facilitating communication between a vehicle and a user comprising:
- providing a base station positioned in the vehicle and a mobile communication unit, the base station comprising a first transmitter for transmitting a signal to the mobile communication unit and a first receiver for receiving a signal from the mobile communication unit;
- tracking a position of the mobile communication unit with respect to the vehicle based on a time of flight of a communication between the mobile communication unit and at least the first transmitter and the first receiver;
- receiving a subsystem status signal relating to performance of a monitored vehicle function;
- determining, based on the subsystem status signal, a monitored function status relating to the monitored vehicle function;
- outputting a status update signal, the status update signal being indicative of the monitored function status; and providing a status indication to a user based on the status update signal in dependence on the position of the mobile communication unit.

Providing a status indication to a user may comprise causing the vehicle to emit light and/or sound.

The method may comprise transmitting the status update signal for receipt by the mobile communication unit.

The method may further comprise;
receiving a request from the mobile communication unit, wherein the request seeks performance of a requested vehicle function comprising the monitored vehicle function;
wherein the status update signal is indicative of a status of the requested vehicle function.

The subsystem status signal may be based on a position of the mobile communication unit relative to the vehicle.

The performance of the requested vehicle function may be based on a position of the mobile communication unit relative to the vehicle.

The performance of the requested vehicle function may be based on an absolute location of the vehicle. The absolute location of the vehicle may based on a global positioning system.

The requested vehicle function may comprise locking a vehicle aperture.

The requested vehicle function may comprise closing a vehicle aperture.

The requested vehicle function may comprise starting a vehicle engine.

The requested vehicle function may comprise controlling a vehicle lighting system.

Providing a status indication may comprise causing the mobile communication unit to emit light. Providing a status indication may comprise causing the mobile communication unit to emit sound. Providing a status indication may comprise causing the mobile communication unit to vibrate.

In one aspect, the present invention provides a vehicle communication system comprising a base station positioned in the vehicle and a mobile communication unit. The base station comprises a first transmitter for transmitting a signal to the mobile communication unit and a first receiver for receiving a signal from the mobile communication unit. The base station is configured to receive a subsystem status signal relating to performance of a monitored vehicle function and to determine, based on the subsystem status signal, a monitored function status relating to the monitored vehicle function. The base station is also configured to transmit a status update signal for receipt by the mobile communication unit, wherein the status update signal is indicative of the monitored function status. The mobile communication unit is configured to receive the status update signal and to provide a status indication to a user based on the status update signal.

Optionally, the base station may be configured to receive a request from the mobile communication unit, wherein the request seeks performance of a requested vehicle function comprising the monitored vehicle function and wherein the status update signal is indicative of a status of the requested vehicle function. The performance of the requested vehicle function may be based on a position of the mobile communication unit relative to the vehicle. The performance of the requested vehicle function may also be based on an absolute location of the vehicle, which may be based on a global positioning system. The subsystem status signal may also depend upon a position of the mobile communication unit relative to the vehicle.

The requested vehicle function may comprise locking a vehicle aperture, closing a vehicle aperture, starting a vehicle engine, or controlling a vehicle lighting system. The mobile communication unit may be configured to provide the status indication by emitting light, by emitting sound, or by vibrating.

In another aspect, a method for facilitation communication between a vehicle and a user comprises providing a base station positioned in the vehicle and a mobile communication unit, wherein the base station comprises a first transmitter for transmitting a signal to the mobile communication unit and a first receiver for receiving a signal from the mobile communication unit. The method includes receiving a subsystem status signal relating to performance of a monitored vehicle function and determining, based on the subsystem status signal, a monitored function status relating to the monitored vehicle function. The method also includes transmitting a status update signal for receipt by the mobile communication unit, wherein the status update signal being indicative of the monitored function status. Finally, the method includes providing a status indication to a user based on the status update signal.

In one embodiment, the method includes receiving a request from the mobile communication unit, wherein the request seeks performance of a requested vehicle function comprising the monitored vehicle function and wherein the status update signal is indicative of a status of the requested vehicle function. In one embodiment of a method for facilitation communication between a vehicle and a user, the subsystem status signal is based on a position of the mobile communication unit relative to the vehicle.

Optionally, the performance of the requested vehicle function is based on a position of the mobile communication unit relative to the vehicle. The performance of the requested vehicle function may also be based on an absolute location of the vehicle. The absolute location of the vehicle may be based on a global positioning system.

In one embodiment, the requested vehicle function may comprise locking a vehicle aperture, closing a vehicle aperture, starting a vehicle engine, or controlling a vehicle lighting system.

In another embodiment, a status indication may comprise emitting light, emitting sound, or vibrating. The system and method thereby enables an indication to be provided to a remotely located user to inform the user whether a requested function was successfully performed even though the user may be out of audible or visual range of the vehicle.

According to another aspect of the invention, there is provided a vehicle having a vehicle communication system, or being adapted to perform a method, as described in any of the preceding aspects.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments unless such features are incompatible.

BRIEF DESCRIPTION OF THE DRAWINGS

One or more embodiments of the present invention will now be described, by way of example only, with reference to the accompanying figures, in which.

DETAILED DESCRIPTION

Figure 1:
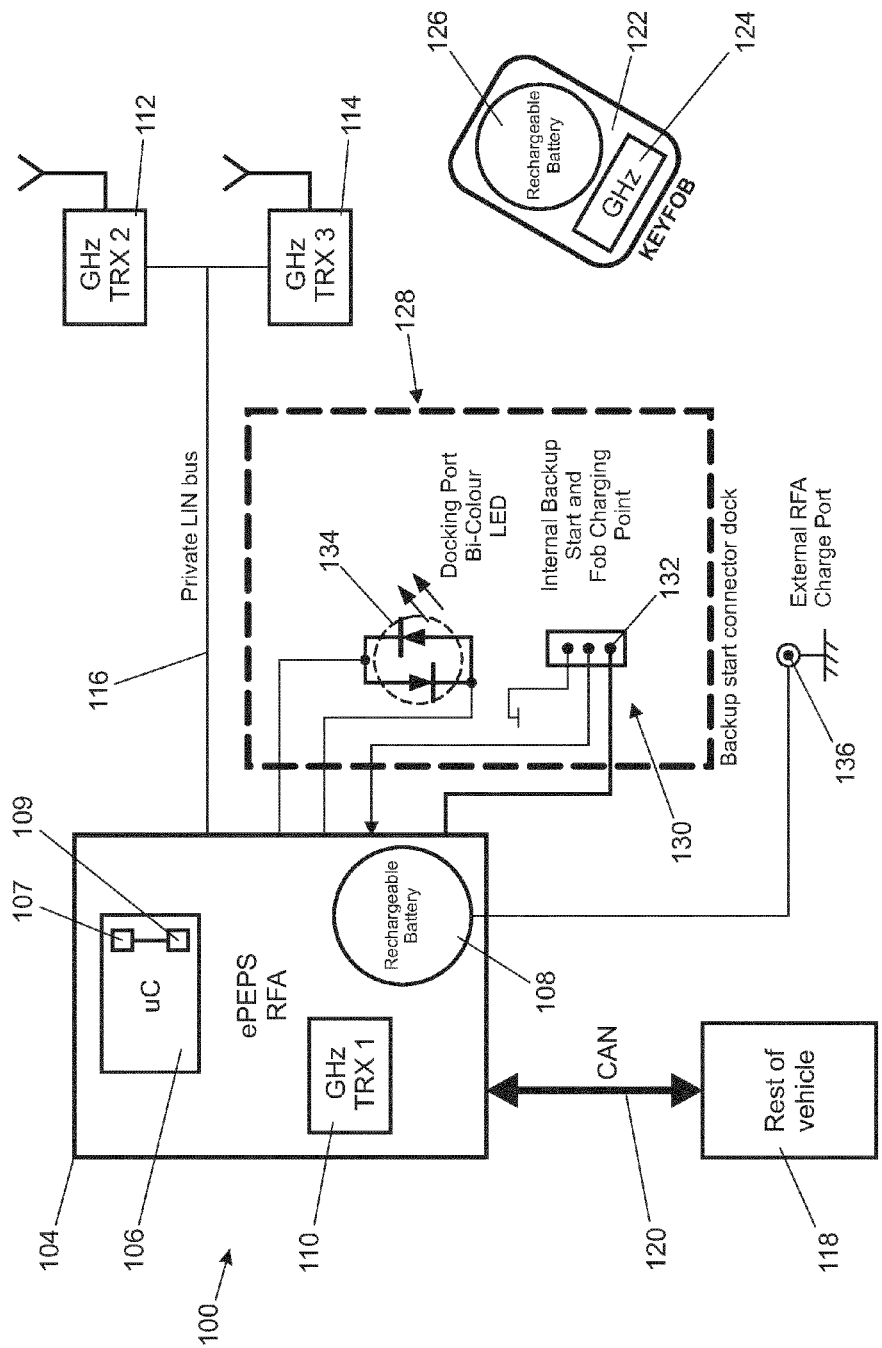
FIG. 1 shows a schematic representation of a vehicle communication system according to an embodiment of the present invention.

FIG. 1 shows a vehicle communication system 100 in accordance with an embodiment of the present invention. The vehicle communication system 100 is configured to facilitate transfer of information among components of the vehicle communication system 100, which may further facilitate control over one or more functions of a vehicle 102. Exemplary functions that may be controlled include, but are not limited to, enhanced Passive Entry and Passive Start (ePEPS) keyless access, remote engine start, remote opening and closing of vehicle apertures, deployment and retraction of external mirrors or antennas, and/or activation and deactivation of lighting and signalling systems of the vehicle 102.

The vehicle communication system 100 will be described with reference to the vehicle 102 which has a front right door 142, a rear right door 144, a front left door 146 and a rear left door 148. The vehicle 102 also has a boot lid 150 (also known as a deck lid) which can be locked/unlocked by the vehicle communication system 100 but this is not described herein for the sake of brevity. The doors 142-148 each have a lock mechanism and an external handle; and the front doors 142, 146 each have a folding door mirror. The lock mechanisms each comprise a door lock switch to provide a locking signal to indicate the status of the respective lock mechanism.

The vehicle communication system 100 comprises a base station 104 to be installed in the vehicle 102 to provide a Remote Function Actuator (RFA) for the vehicle 102. The base station 104 comprises an electronic control unit 106 and a first rechargeable battery 108.

The electronic control unit 106 comprises a memory storage device 107 that is in communication with one or more processor(s) 109. The processor(s) 109 can be configured to perform computational operations in accordance with instructions (e.g., software) stored in the memory storage device 107. The first rechargeable battery 108 provides a dedicated power supply for the base station 104 to enable its operation independently from a vehicle power system (not shown).

The base station 104 further comprises first, second and third ultra-wideband transceivers 110, 112, 114. The first transceiver 110 is provided proximal the electronic control unit 106. The second and third transceivers 112, 114 are positioned in the vehicle 102 remote from the electronic control unit 106 and connected via a dedicated local interconnect network (LIN) 116. The transceivers 110, 112, 114 each have an integrated antenna. As discussed more fully below, the vehicle communication system 100 may further comprise a fourth transceiver (not shown) which is also positioned in the vehicle 102 remote from the electronic control unit 106 and connected via the dedicated local interconnect network (LIN) 116.

The base station 104 is connected to the vehicle systems (denoted generally by the reference numeral 118) via a CAN bus 120. The base station 104 can thereby receive signals from the vehicle systems (e.g., locking signals from door lock switches); and can control operation of one or more vehicle systems (e.g., door lock mechanisms, closure systems for vehicle apertures such as windows, sun roof, ventilation systems, deck lid, engine start/ignition, vehicle lighting, entertainment systems, horn, heater, air conditioning, and the like). The CAN bus 120 can also be employed to convey instructions from the electronic control unit 106 to other systems (e.g., actuators, controls) of the vehicle 102, such as the engine control unit, to facilitate enabling and/or disabling of one or more vehicle systems (e.g., passive engine starting).

The vehicle communication system 100 further comprises a mobile communication unit 122 having a remote ultra-wideband transceiver 124 and a second rechargeable battery 126. The mobile communication unit 122 is portable to facilitate its being carried by the user. As described herein, the mobile communication unit 122 communicates with the base station 104 to facilitate control over vehicle functions, such as passive entry to the vehicle 102, and, under some circumstances, to provide information to a user in possession of the mobile communication unit 122.

The base station 104 further comprises a dock 128 for receiving the mobile communication unit 122. The dock 128 has a port 130 to enable communication between the base station 104 and the mobile communication unit 122. A charging pad 132 is also provided in the dock 128 to facilitate charging of the second rechargeable battery 126 when the mobile communication unit 122 is docked and thus mated with the charging pad 132. A bi-colour light emitting diode 134 is provided in the dock 128 to indicate the status of the mobile communication unit 122 (for example to indicate that the second rechargeable battery 126 is charging or is fully charged). The charging pad 132 is connected to a power supply unit (PSU) provided in the base station 104. An external charge port 136 for the base station 104 is provided for charging the first rechargeable battery 108.

Figure 2:
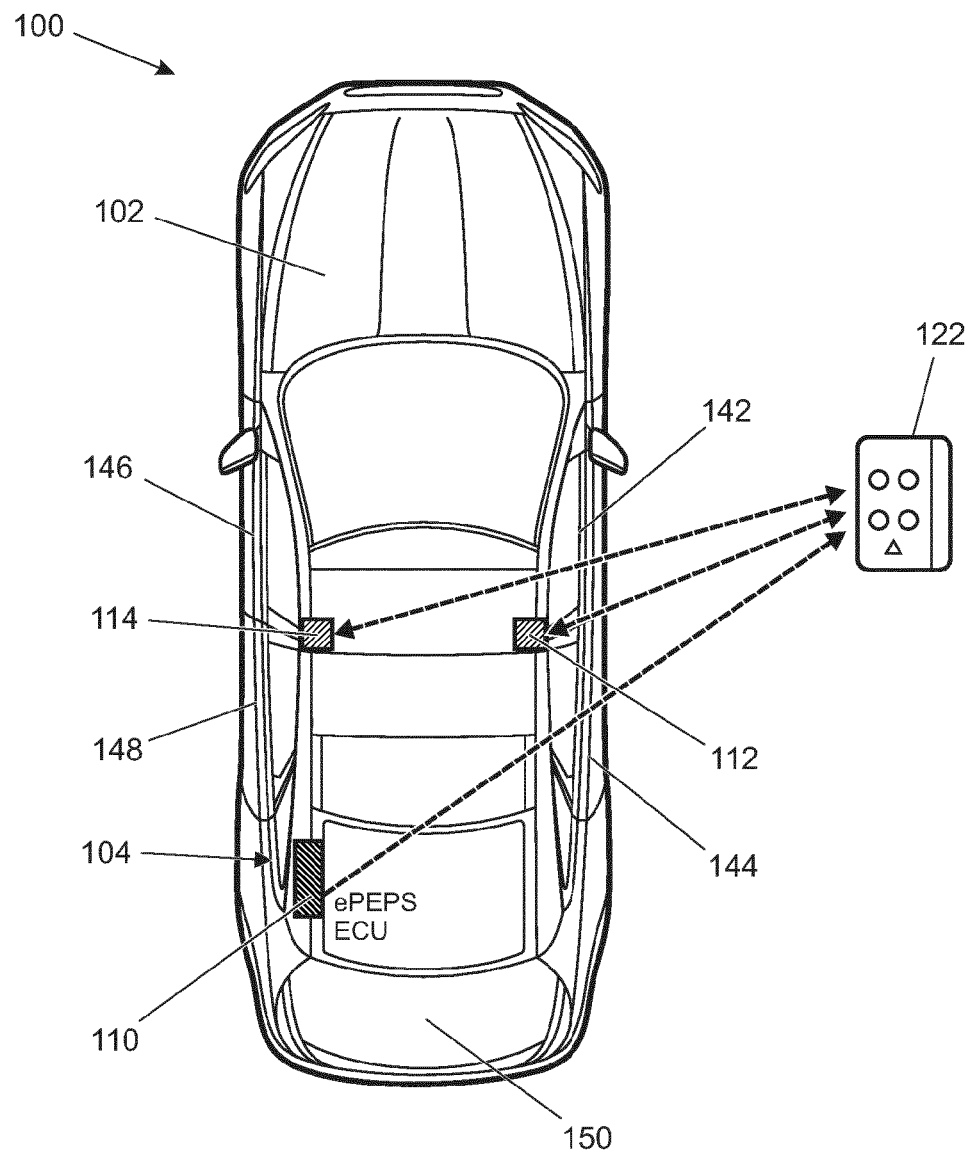
FIG. 2 shows the installation of the base station and transceivers of the vehicle communication system according to one embodiment of the present invention in a motor vehicle.

The installation of the vehicle communication system 100 is illustrated in FIG. 2. The base station 104 and the first transceiver 110 are located at the rear of the vehicle 102 and the second and third transceivers 112, 114 are located in the upper part of the vehicle 102 (typically in the roof) on the right and left sides respectively of the vehicle 102. As illustrated by dashed lines in FIG. 2, the transceivers 110, 112, 114 communicate with the mobile communication unit 122. The distance from each of the first, second and third transceivers 110, 112, 114 to the remote transceiver 124 can be determined by measuring transmission and/or response time (for example, time of flight for a signal transmission) thereby allowing the position of the mobile communication unit 122 in relation to the vehicle 102 to be determined through triangulation. The use of ultra-wideband frequencies (typically greater than 3 GHz) allows the position of the mobile communication unit 122 to be tracked with a relatively high degree of accuracy.

In accordance with such an embodiment of the vehicle communication system 100, wherein the base station 104 comprises three transceivers 110, 112, 114 disposed at spaced-apart positions within the vehicle 102, it is possible to use the transmission and/or response times for communications sent between the mobile communication unit 122 and each of the transceivers 110, 112, 114 to determine a position of the mobile communication unit 122 relative to the vehicle 102 along each of two axes. For example, with the base station 104 and the first transceiver 110 located toward the rear of the vehicle 102 and with the second and third transceivers 112, 114 disposed within the roof (on respective left and right sides), the position of the mobile communication unit 122 relative to the vehicle 102 can readily be determined, i.e. as shown in the plan view of FIGS. 2 to 6.

However, with the second and third transceivers 112, 114 disposed in the vehicle roof, and therefore lying in the same horizontal plane, there may be situations in which it is not possible to readily determine the position of the mobile communication unit 122 along a direction normal to the plan views of FIGS. 2 to 6 (i.e., above or below the vehicle 102). Accordingly, in a further embodiment of the invention, the vehicle communication system 100 may comprise a fourth transceiver (not shown) which is disposed within the vehicle 102 at a position that is spaced apart in a vertical direction from both the plane of the vehicle roof and the horizontal plane in which the base station 104 lies. For example, the fourth transceiver (not shown) could be mounted in the vehicle dashboard on the vehicle center line. With this configuration, the height of the mobile communication unit 122 relative to the vehicle 102 can readily be determined.

Thus, a position of the mobile communication unit 122 relative to the vehicle 102 may be periodically or continuously determined and may be saved in the memory storage device 107 for subsequent retrieval and analyses by the processor 109 in accordance with instructions that are also stored in the memory storage device 107 or pre-programmed into the processor 109. Such monitoring and storing and processing of position information may be useful for observing, tracking, and identifying not only positions of the mobile communication unit 122, but also certain rates, patterns, and/or characteristics of changes in those positions (i.e., movements of the mobile communication unit 122).

Accordingly, the vehicle communication system 100 may be configured to detect an approach of the mobile communication unit 122 toward an authorization zone 138 defined relatively to the vehicle 102, to detect a departure of the mobile communication unit 122 from the authorization zone 138, to detect a continuing presence of the mobile communication unit 122 within the authorization zone 138, and to recognize patterns involving combinations of approaches, departures, and prolonged presences relative to the authorization zone 138 of the vehicle 102. In addition, the vehicle communication system 100 may be configured to determine a position of the mobile communication unit 122 relative to the vehicle 102 and to compare that relative position to one or more predetermined (or learned) criteria. The results of that comparison may then be used by the vehicle communication system 100 in determining whether and how to transmit further communications or to facilitate performance of certain vehicle functions.

The remote transceiver 124 of the mobile communication unit 122 transmits a polling signal which, when received by the first transceiver 110 of the base station 104, initiates communication between the base station 104 and the mobile communication unit 122. In one embodiment, upon receipt of the polling signal, the first transceiver 110 responds by transmitting a challenge signal. The challenge signal is received by the mobile communication unit 122 and prompts the mobile communication unit 122 to transmit a response signal. The electronic control unit 106 receives the response signal and attempts to determine whether it was sent by an authorized device (i.e., to validate or authenticate the mobile communication unit 122).

If the response signal is authenticated, the electronic control unit 106 continues to communicate with the mobile communication unit 122 and tracks its position in relation to the vehicle 102 and may store the position information in the memory storage device 107 for retrieval and processing by the processor 109 in accordance with pre-defined instructions. Moreover, provided the challenge/response sequence is completed successfully, the electronic control unit 106 will provide control over functions of the vehicle 102 subject to satisfaction of operating criteria. If the response signal is not authenticated, the electronic control unit 106 will not facilitate user control over vehicle functions, such as unlocking the doors of vehicle 102 or starting the engine of vehicle 102.

In one mode of operation, the polling signal is transmitted continually by the remote transceiver 124 so that communication with the base station 104 is initiated by the mobile communication unit 122. Accordingly, the vehicle communication system 100 can initiate a challenge/response cycle without the need for user interaction, such as actuating a door handle.

In another mode of operation, such as may be active upon first entry of the vehicle 102 into service, to conserve energy stored in the second rechargeable battery 126, the polling signal is transmitted for an operating period of thirty (30) days. The transmission of the polling signal is stopped if the mobile communication unit 122 does not establish communication with the base station 104 during the operating period. A button provided on the mobile communication unit 122 can be pressed to re-commence transmission of the polling signal after said operating period has expired.

In another embodiment, the polling signal is transmitted intermittently, rather than continuously. In accordance with this embodiment, the polling signal is repeated during the operating period with a time interval between transmission cycles (pulses), i.e. the polling signal is transmitted periodically during the operating period. The time interval between the transmission cycles can be modified in response to measured parameters. For example, the time interval between transmissions can be modified depending on the measured distance between the vehicle 102 and the mobile communication unit 122. For example, if the mobile communication unit 122 is close to the vehicle 102, the time interval can be reduced to one (1) second. Conversely, if the mobile communication unit 122 is relatively far away from the vehicle 102, the time interval can be increased to five (5) seconds.

The base station 104 and the mobile communication unit 122 can communicate with each other over a range of at least 20 meters and, in some embodiments, up to at least 100 meters. The authorization zone 138 is defined within the communication range. For example, the authorization zone 138 may be defined as having a radius of 2 meters around the vehicle 102. When the electronic control unit 106 determines that the mobile communication unit 122 is inside the authorization zone 138, the base station 104 may facilitate automatic unlocking of one or more of the vehicle's doors 142-148. Conversely, when the electronic control unit 106 determines that the mobile communication unit 122 is outside the authorization zone 138, the base station 104 may cause the automatic locking of the vehicle's doors 142-148.

As discussed above, a vehicle communication system 100 comprising three or fewer transceivers may be able to determine a position of the mobile communication unit 122 relative to the vehicle 102 along only two axes. Accordingly, the authorization zone 138 may be defined in terms of only those two axes. A vehicle communication system 100 comprising four or more transceivers, however, may be able to determine a position of the mobile communication unit 122 relative to the vehicle 102 along any combination of three (optionally orthogonal) axes. Accordingly, the dimensions of the authorization zone 138 may be defined in terms positions along each of the three axes, such that the authorization zone 138 (and thus the set of positions that are outside the authorization zone 138) may be defined in terms of three-dimensional space relative to the vehicle 102.

Being able to accurately determine the position of the mobile communication unit 122 in a three-dimension space around the vehicle 102 may be particularly useful in certain situations, for example when the vehicle 102 is parked in a multi-level or multi-story car park or adjacent to a multi-story building. In such situations it is possible that the driver, having exited the vehicle 102 may move to another level of the car park or building above or below the vehicle 102, but may still be sufficiently close to the vehicle 102 to be within the authorization zone 138, resulting in one or more of the vehicle doors being automatically unlocked.

Accordingly, if it is determined that the mobile communication unit 122 is disposed sufficiently above or below the vehicle 102, such as in the example of the multi-level car park, the electronic control unit 106 may use that position information, if it is known, to not unlock the vehicle doors even when the mobile communication unit 122 would otherwise be judged to be within an authorization zone 138 defined in only two dimensions.

The electronic control unit 106 may be configured to operate the vehicle communication system 100 according to a number of operating modes. In a number of scenarios, the mobile communication unit 122 is carried on the person of the user and therefore follows the movements of the user. In the accompanying figures, movement paths of the user, and therefore, the mobile communication unit 122, are illustrated by a set of footprints 140. The process performed by the base station 104 for authenticating the mobile communication unit 122 is the same as described above and is common to each of the operating modes.

In particular, the remote transceiver 124 transmits a polling signal which initiates an authentication cycle with the first transceiver 110. The base station 104 transmits a challenge signal which triggers transmission of a response signal from the mobile communication unit 122. The electronic control unit 106 validates the response signal and, if successful, the base station 104 tracks the range and position of the authenticated mobile communication unit 122. If the authentication cycle is not successfully completed, for example due to an incorrect response signal being sent from the mobile communication unit 122, the function will not be performed (e.g., the doors 142-148 will not be unlocked), and the vehicle 102 will not respond to commands dispatched from the mobile communication unit 122.

Figure 3:
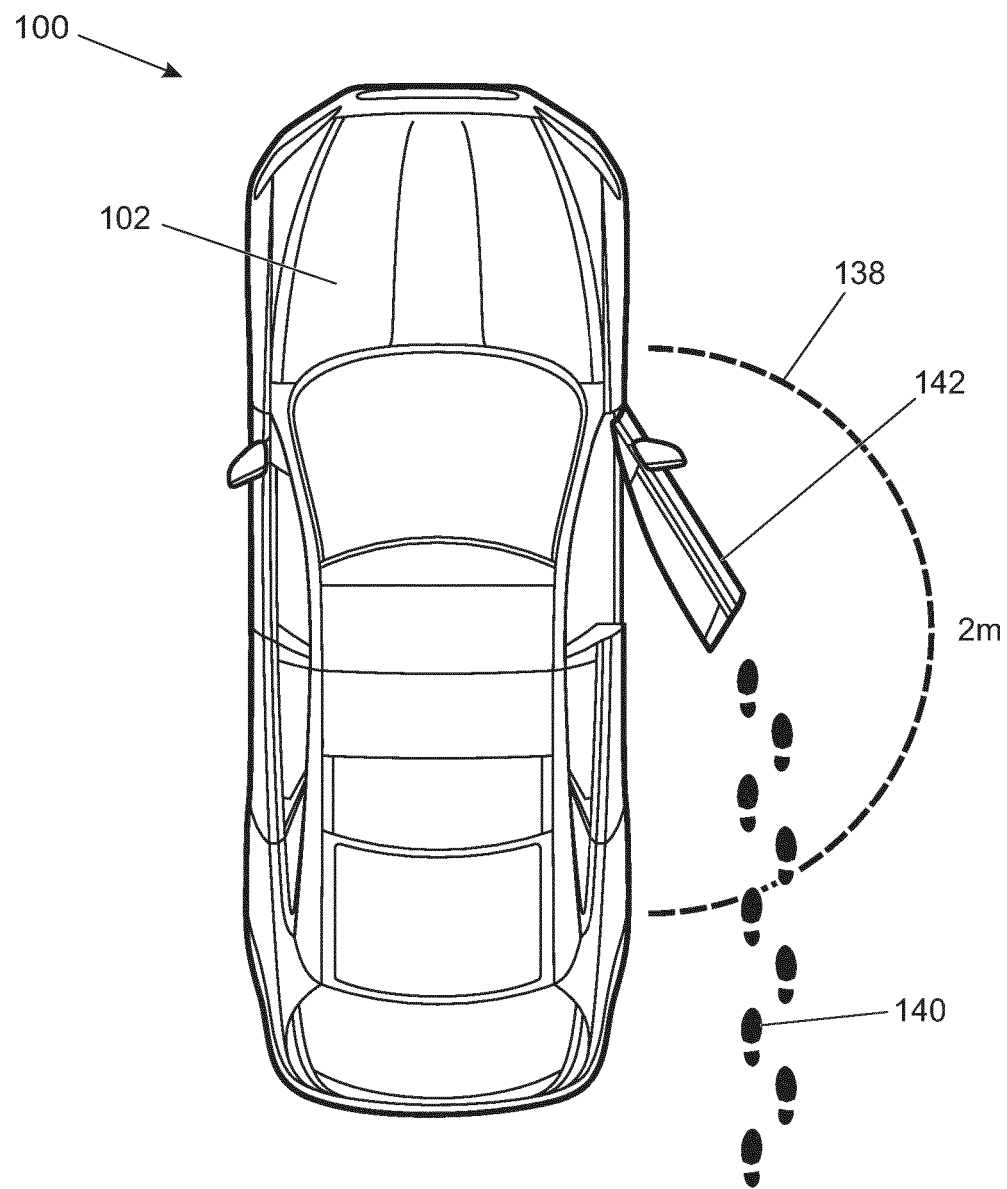
FIG. 3 shows an operating mode of the vehicle communication system according to one embodiment of the present invention.

The electronic control unit 106 may be configured to operate the vehicle communication system 100 according to a first operating mode as illustrated in FIG. 3. In this operating mode, the vehicle communication system 100 operates to unlock the doors 142-148 on the side of the vehicle 102 on which the user approaches with the mobile communication unit 122. Having authenticated the mobile communication unit 122, the base station 104 tracks the range and position of the mobile communication unit 122. In the illustrated example, the electronic control unit 106 determines that the mobile communication unit 122 is on the right hand side of the vehicle 102. Once the base station 104 determines that the mobile communication unit 122 is within the authorization zone 138, the electronic control unit 106 automatically generates a door unlock signal to unlock both doors 142, 144 on the right hand side of the vehicle 102. The door unlock signal is transmitted via the CAN bus 120, and the front right door 142 and the rear right door 144 are both unlocked when the mobile communication unit 122 enters the authorization zone 138. As the doors 142, 144 are unlocked before the user operates the respective door handle, in normal operating conditions it is envisaged that there would be no perceptible delay when the user operates the door handle.

In this mode, when the user operates the door handle on either the front right door 142 or the rear right door 144, either a single-point entry (SPE) or a multiple-point entry (MPE) can be initiated. In single-point entry mode, when the driver's door is the only opened door and the key fob is taken into the vehicle, the rear door on the approached side will be re-locked. For the avoidance of doubt, the driver's door does not have to be closed to effect the locking of the rear door. If ANY door other than driver's door is opened, then all doors will be unlocked and remain so. The action of locking the rear door on the driver's side is caused by the key fob being detected inside the vehicle and thus no longer seen in the authorisation zone on the outside of the vehicle. In a multiple-point entry, the electronic control unit 106 generates control signals to unlock all of the other doors in the vehicle 102 when the door handle of either the front right door 142 or the rear right door 144 is operated. It will be appreciated that the front left door 146 and the rear left door 148 will be unlocked if base station 104 determines that the mobile communication unit 122 enters the authorization zone 138 on the left hand side of the vehicle 102. Only when the door handle of one of the unlocked doors 142-148 is operated, an indication is provided that the doors have been unlocked, for example by flashing the side repeaters and/or extending the door mirrors. If none of the door handles are operated, however, no indication is provided that one or more of the doors 142-148 have been unlocked.

Figure 4:
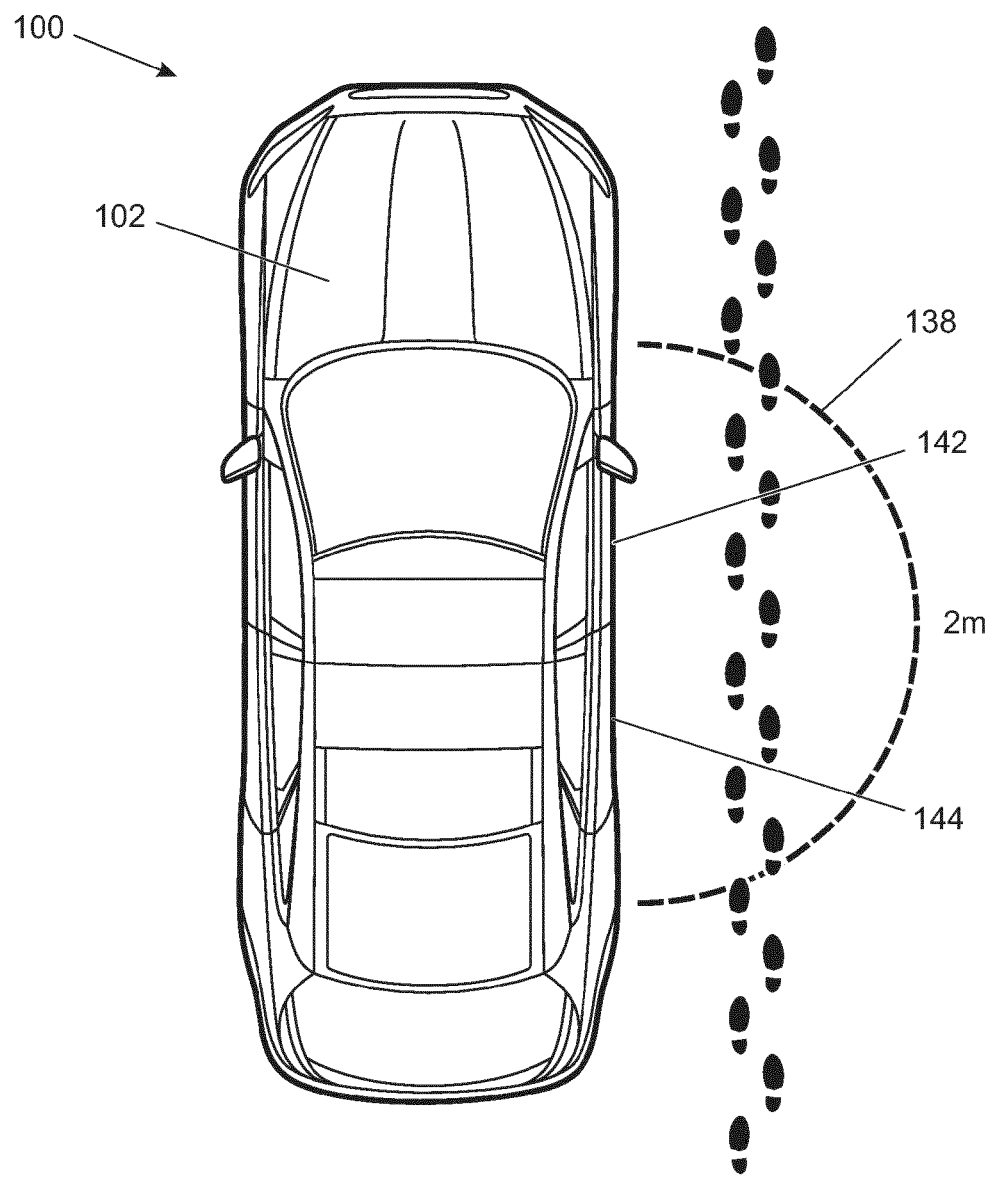
FIG. 4 illustrates another operating mode of the vehicle communication system according to one embodiment of the present invention.

The electronic control unit 106 may be configured to operate the vehicle communication system 100 according to a second operating mode as illustrated in FIG. 4 to accommodate a walk-past scenario. In this walk-past scenario, the user enters and exits the authorization zone 138 but does not operate a door handle. As in the first mode described above, the base station 104 authenticates the mobile communication unit 122 as it approaches the vehicle 102. In this case, the base station 104 tracks the position of the mobile communication unit 122 and determines that the user is approaching from the rear of the vehicle 102 on the right hand side. As described above in regard to the first mode of operation, when the vehicle communication system 100 detects that the mobile communication unit 122 has entered the authorization zone 138, as it has in this walk-past scenario, a door unlock signal is transmitted to unlock the front right door 142 and the rear right door 144.

In this scenario, however, the user does not operate the door handle on either of the doors 142, 144 and, instead, walks past the vehicle 102. Since the vehicle communication system 100 is tracking the position of the mobile communication unit 122, the vehicle communication system 100 is able to determine when the mobile communication unit 122 leaves the authorization zone 138. Accordingly, upon the departure of the mobile communication unit 122 from the authorization zone 138, and lacking the receipt of any indication that a door handle has been operated, the base station 104 transmits a door lock signal to lock the front right door 142 and the rear right hand door 144 or otherwise facilitates the re-locking of those doors. In one embodiment, the vehicle 102 does not provide a visual indication when the doors 142, 144 are unlocked or subsequently locked.

Figure 5:
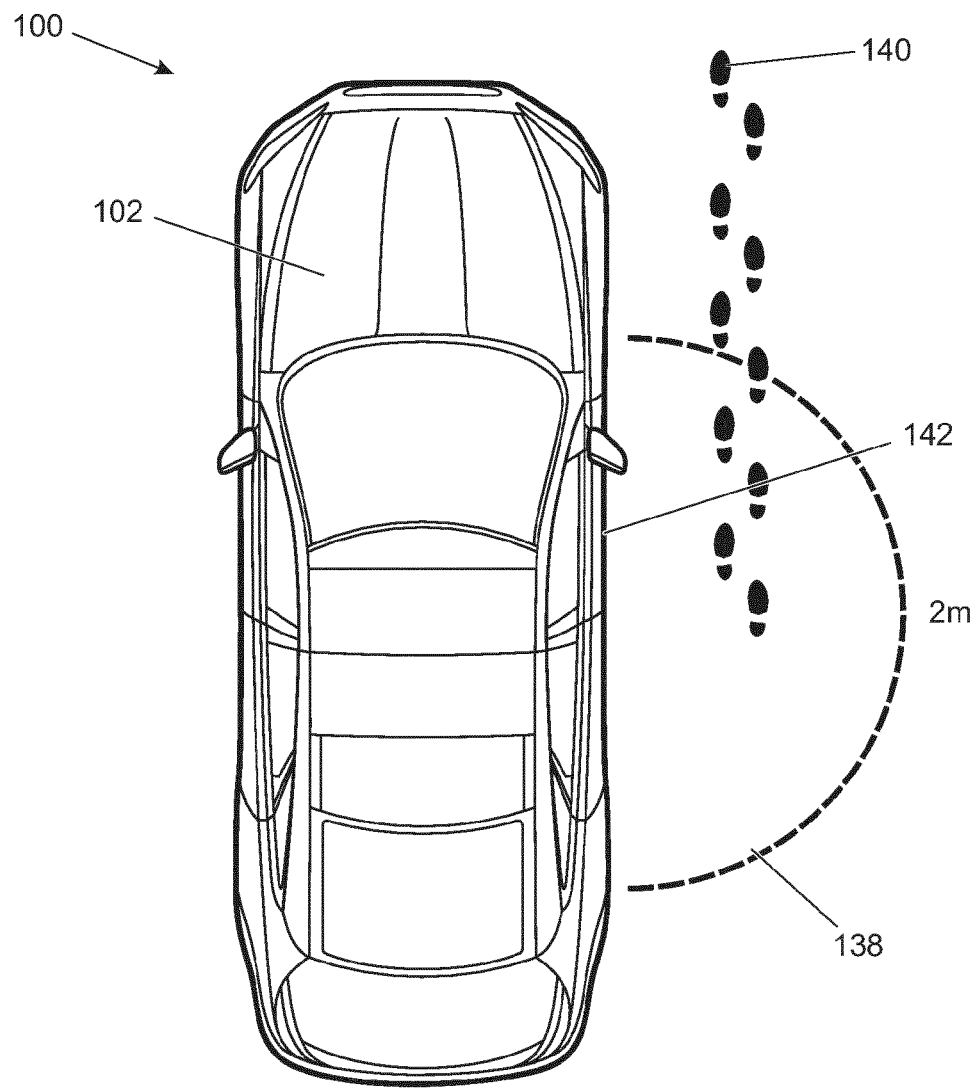
FIG. 5 illustrates another operating mode of the vehicle communication system according to one embodiment of the present invention.

The electronic control unit 106 may be configured to operate the vehicle communication system 100 according to a third operating mode as illustrated in FIG. 5 to facilitate the automatic locking of the doors 142-148 when the user walks away from the vehicle 102. In this scenario, the user exits the vehicle 102 carrying the mobile communication unit 122 and closes the vehicle doors 142-148. In the illustrated example, the user exits the vehicle 102 through the front right door 142 and then closes it. The user then walks away from the vehicle 102 carrying the mobile communication unit 122.

As the mobile communication unit 122 is carried away from the vehicle 102, the vehicle communication system 100 tracks the position of the mobile communication unit 122 and compares that position to the definition of the authorization zone 138. If and when the vehicle communication system 100 determines that the mobile communication unit 122 has left the authorization zone 138, the vehicle communication system 100 transmits a door lock signal to lock the doors 142-148. The vehicle 102 is thereby secured automatically without the user activating the mobile communication unit 122 or taking any action other than walking away from the vehicle 102. A security protocol to comply with industry standards, for example those specified by Thatcham®, would typically be undertaken for the automatic locking of the doors 142-148. Under normal operating conditions, the automatic locking of the vehicle 102 does not double-lock the vehicle 102. Rather, the vehicle 102 would only be double-locked if the user specifically selected this locking mode, for example via a control panel in the vehicle 102.

Figure 6:
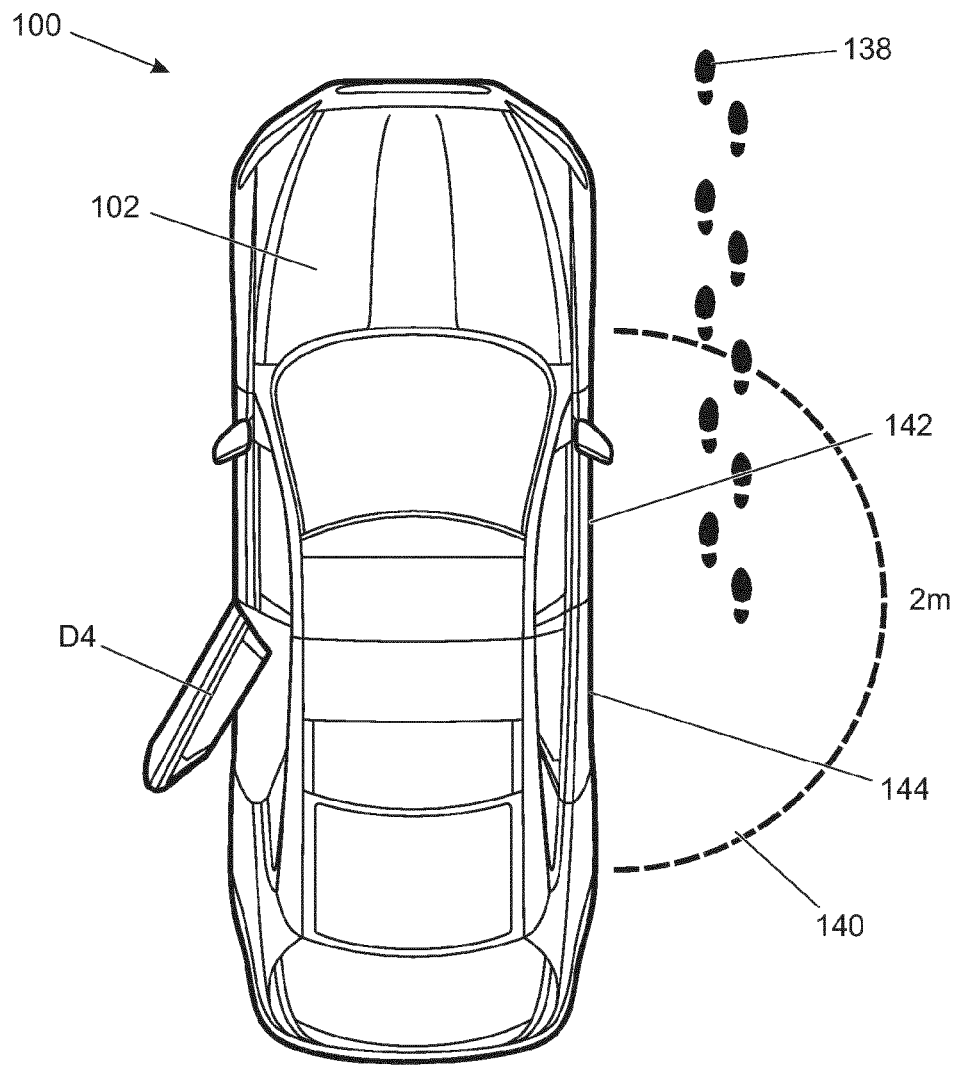
FIG. 6 illustrates another operating mode of the vehicle communication system according to one embodiment of the present invention.

The electronic control unit 106 may be further configured to operate the vehicle communication system 100 according to a fourth operating mode as illustrated in FIG. 6 to accommodate a mis-lock scenario. This mode is similar to the third operating mode described above insofar as the user exits the vehicle 102 through the front right door 142 and closes the door 142 before walking away from the vehicle 102. In connection with this fourth operating mode, the vehicle communication system 100 again determines if and when the mobile communication unit 122 has departed the authorization zone 138. As illustrated in FIG. 6, however, the rear left door 148 is ajar, and the electronic control unit 106 determines that the door 148 cannot be locked (a so-called mis-lock).

To avoid the user leaving the vehicle 102 in an unsecure state (as may otherwise occur if the operator had not noticed that the rear left door 148 was ajar) the electronic control unit 106 transmits an alert signal to the CAN bus 120 and a notification is provided to the user. For example, the CAN bus 120 may illuminate the side repeaters and/or provide an audible warning to notify the user that the doors 142-148 have not all been locked. When the rear left door 148 is closed, the vehicle communication system 100 will lock the door 148 to secure the vehicle 102.

In conjunction with the above-described modes of operation, the electronic control unit 106 may be configured to operate the vehicle communication system 100 according to a fifth operating mode, facilitating active communication among components of the vehicle communication system 100. In order to identify and avoid unintended and unnecessary actuation of vehicle systems, and to provide status information to a user, it may be advantageous for the electronic control unit 106 to be able to determine status information regarding the vehicle 102 so that the base station 104 may communicate that information to the mobile communication unit 122 to better inform the user.

Accordingly, in one embodiment of a vehicle communication system 100, the base station 104 is configured to receive a subsystem status signal relating to performance of a monitored vehicle function and to determine, based on the subsystem status signal, a monitored function status relating to the monitored vehicle function. The base station 104 is also configured to transmit a status update signal for receipt by the mobile communication unit 122 with the status update signal being indicative of the monitored function status. In accordance with this embodiment, the mobile communication unit 122 is configured to receive the status update signal and to provide a status indication to a user based on the status update signal. Optionally, the base station 104 may be configured to receive a request from the mobile communication unit 122, with the request seeking performance of a requested vehicle function that comprises the monitored vehicle function. In such embodiments, the status update signal is indicative of a status of the requested vehicle function. It should be appreciated that request seeking performance of a requested vehicle function may request that such performance be contingent on a position of the mobile communication unit 122 relative to the vehicle. For example, a request to open a vehicle aperture may be contingent upon (i.e., may be based on) whether the mobile communication unit 122 is within a predetermined distance from the vehicle. Similarly, the performance of the requested vehicle function may be based on an absolute location of the vehicle, and that absolute location may be further based on information received from a global positioning system.

The subsystem status signal may be based on a number of relevant parameters such as a position of the mobile communication unit 122 relative to the vehicle 102 or a location of the vehicle 102 based on a global positioning system. The subsystem status signal may originate in one or more sensors integrated into a vehicle subsystem and may be indicative of an impossibility of completing a vehicle function, of a potential or possibility for completing performance of the vehicle function, of a successfully completed performance of the vehicle function, of an unsuccessfully completed attempt to perform the vehicle function, or an unavailability of the vehicle function in the particular circumstance in which the vehicle 102 and the vehicle communication system 100 exist.

Both the requested vehicle function and the monitored vehicle function may include vehicle functions such as closing a vehicle aperture, and/or locking the vehicle aperture. Monitored vehicle functions may include any subordinate process involved in a requested vehicle function. For example, locking a vehicle aperture may include checking whether a vehicle aperture is closed, activating a switch, sending a current pulse to a lock actuator, and engaging a latch. The vehicle function may also comprise unlocking a vehicle aperture, opening a vehicle aperture, starting a vehicle engine, stopping a vehicle engine, controlling a vehicle lighting system, controlling a vehicle infotainment system, or controlling a vehicle environmental control system.

The mobile communication unit 122 may be configured to provide the status by emitting light, such as by illuminating a coloured LED, with different colours being indicative of differing status. Similarly, the mobile communication unit 122 may be configured to provide the status by emitting sound. For example, different tones may be emitted by the mobile communication unit 122 so as to indicate different status. Further still, the mobile communication unit 122 may be configured to provide the status by vibrating, with different vibration frequencies being indicative of different status.

A method for facilitation communication between a vehicle 102 and a user includes providing a base station 104 positioned in the vehicle 102 and a mobile communication unit 122, wherein the base station 104 comprises a first transmitter for transmitting signals and a first receiver for receiving a signal from the mobile communication unit 122 in response to said transmitted signal. The method includes receiving a subsystem status signal relating to performance of a monitored vehicle function and determining, based on the subsystem status signal, a monitored function status relating to the monitored vehicle function. The method also includes transmitting a status update signal for receipt by the mobile communication unit 122, with the status update signal being indicative of the monitored function status. Finally, the method includes providing a status indication to a user based on the status update signal.

The system and method thereby enables an indication to be provided to a remotely located user to inform the user whether a requested function was successfully performed even though the user may be out of audible or visual range of the vehicle 102.

For example, the system may provide acknowledgment to the mobile communication unit 122 when a requested operation has been performed. The system may also provide the user with an indication when the requested operation cannot or has not been performed.

In one embodiment, a user may request a status verification using the mobile communication unit 122. In this embodiment, the mobile communication unit 122 sends a request for status to the base station 104. In response, the base station 104 queries the systems, determines a status, and transmits a signal indicative of the status to the mobile communication unit 122. The mobile communication unit 122 then provides the output to be received by the user. Accordingly, the system facilitates providing a user with an update on a status of the vehicle 102. In one embodiment, the status information is automatically transmitted by the base station 104 for receipt and display by the mobile communication unit 122. In accordance with this embodiment, the user need not initiate a query, but may merely glance at the mobile communication unit 122 for an indication of a status of the vehicle 102. For example, if the vehicle 102 is not secured, such as by having all apertures closed and locked, the base station 104 may transmit a signal indicating the vehicle 102 is not secure, and the mobile communication unit 122 may illuminate a corresponding LED, such as an orange LED, that is indicative of the insecure status.

In one embodiment, a vehicle communication system 100 provides rapid feedback response to a request from a user, informing the user within a matter of seconds whether the command has been successful. Indications may be using visual, audible, or haptic, thereby eliminating any necessity for the user to approach the vehicle 102 to determine whether the requested function has been successfully completed.

For example, a status LED hosted on the mobile communication unit 122 may flash red while the button is pressed and may extinguish or become green when the button is released, with the green light providing a visual feedback to indicate that the function was successfully performed. In an alternative embodiment, the mobile communication unit 122 may emit an audible tone. In another embodiment, the mobile communication unit 122 may be configured to vibrate. In another embodiment, the mobile communication unit 122 may be configured to provide a combination of user-configurable indications selected from the group consisting of light emissions, sound emissions, and vibrations to alert the customer that the action was not completed or to confirm to the customer that the action was completed.

The vehicle communication system 100 can optionally also provide keyless engine starting for the vehicle 102. By using the ranging data from the transceivers 110, 112, 114, the electronic control unit 106 can determine when the mobile communication unit 122 is inside the vehicle 102. A control signal can be transmitted to the engine control unit, via the CAN bus 120, to permit keyless engine starting when a Start button is pressed.

The vehicle communication system 100 according to the present invention can be further refined. In particular, the electronic control unit 106 can be configured to transmit a status signal to the mobile communication unit 122. For example, if the base station 104 detects a mis-lock scenario, the status signal may instruct the mobile communication unit 122 to generate a first user alert. Equally, the status signal may instruct the mobile communication unit 122 to generate a second user alert (which is different from the first user alert) when the vehicle 102 has been locked. The first and/or the second user alert could be provided instead of, or in addition to, any notification provided by the vehicle 102. The mobile communication unit 122 could comprise an audio, optical or haptic output for indicating the vehicle status. For example, the mobile communication unit 122 could comprise one or more of the following: LED(s), a text screen or a vibrating mechanism.

The mobile communication unit 122 is also provided with one or more buttons to allow a user to trigger locking/unlocking of the vehicle doors from outside of the authorization zone 138.

The ultra-wideband (UWB) transceivers 110, 112, 114, 124 described herein are compliant with IEEE802.15.4a protocol.

The vehicle communication system 100 can monitor time of flight (ToF) communications between the base station 104 and the mobile communication unit 122 to provide improved security, for example to protect against a relay-station security attack.

A door unlock override switch can be provided to unlock the doors 142-148 in the event of an emergency.

The skilled person will understand that various changes and modifications can be made to the vehicle communication system 100 described herein without departing from the spirit and scope of the present invention. For example, a welcome lights function could be supported by illuminating an interior and/or exterior vehicle light when the mobile communication unit 122 enters the authorization zone 138.

Although the vehicle communication system 100 has been described with reference to the mobile communication unit 122 transmitting the polling signal, the system could also operate if the base station 104 transmitted the polling signal. For example, the first transceiver 110 of the base station 104 may transmit a polling signal which, when received by the remote transceiver 124, initiates communication between the mobile communication unit 122 and the base station 104. In one embodiment, upon receipt of the polling signal, the mobile communication unit responds by transmitting a response signal. The response signal is received by the first transceiver 110 and the electronic control unit 106 validates the response signal.

The mobile communication unit 122 includes a motion sensor, such as a gyroscope or an accelerometer, to detect movements of the mobile communication unit 122. Signals based on the detected movements may then be transmitted to the base station 104 for use in deciding whether, when and how to facilitate control over functions of the vehicle 102. For example, if the base station 104 determines that the mobile communication unit 122 has been stationary for a predetermined period of time, the base station 104 may cause the mobile communication unit 122 to be disabled or to enter a sleep mode. In addition, the base station 104 could transmit a disable signal to deactivate the transceivers 110, 112, 114, 124. Alternatively, the transceivers 110, 112, 114, 124 could be disabled automatically if they do not receive an authorization signal for a predetermined period of time. The mobile communication unit 122 could be awakened by an activation signal from the motion sensor when it detects movement.

Moreover, it will be appreciated that it is not necessary for a vehicle communication system 100 according to the present invention to provide all of the operating modes described herein. Rather, one or more of the operating modes could be embodied in a vehicle communication system 100 in accordance with the present invention.

It will be appreciated that various changes and modifications can be made to the present invention without departing from the present invention. Further aspects of the present invention will be described with reference to the following numbered paragraphs.

1. A vehicle communication system (100) for facilitating control over a function of a vehicle, the vehicle communication system (100) comprising: a base station (104) positioned in the vehicle; and a mobile communication unit (122); wherein the base station (104) comprises a first transmitter for transmitting a signal to the mobile communication unit (122) and a first receiver for receiving a signal from the mobile communication unit (122); wherein the base station (104) is configured to: receive a subsystem status signal relating to performance of a monitored vehicle function; determine, based on the subsystem status signal, a monitored function status relating to the monitored vehicle function; and transmit a status update signal for receipt by the mobile communication unit (122), the status update signal being indicative of the monitored function status; wherein the mobile communication unit (122) is configured to: receive the status update signal; and provide a status indication to a user based on the status update signal.

2. A vehicle communication system (100) as described in paragraph 1: wherein the base station (104) is configured to receive a request from the mobile communication unit (122), wherein the request seeks performance of a requested vehicle function comprising the monitored vehicle (102) function; and wherein the status update signal is indicative of a status of the requested vehicle function.

3. A vehicle communication system (100) as described in paragraph 1, wherein the subsystem status signal is based on a position of the mobile communication unit (122) relative to the vehicle.

4. A vehicle communication system (100) as described in paragraph 2, wherein the performance of the requested vehicle function is based on a position of the mobile communication unit (122) relative to the vehicle.

5. A vehicle communication system (100) as described in paragraph 2, wherein the performance of the requested vehicle function is based on an absolute location of the vehicle.

6. A vehicle communication system (100) as described in paragraph 5, wherein the absolute location of the vehicle is based on a global positioning system.

7. A vehicle communication system (100) as described in paragraph 2, wherein the requested vehicle function comprises locking a vehicle aperture.

8. A vehicle communication system (100) as described in paragraph 2, wherein the requested vehicle function comprises closing a vehicle aperture.

9. A vehicle communication system (100) as described in paragraph 2, wherein the requested vehicle function comprises starting a vehicle engine.

10. A vehicle communication system (100) as described in paragraph 2, wherein the requested vehicle function comprises controlling a vehicle lighting system.

11. A vehicle communication system (100) as described in paragraph 1, wherein the mobile communication unit (122) is configured to provide the status indication by emitting light.

12. A vehicle communication system (100) as described in paragraph 1, wherein the mobile communication unit (122) is configured to provide the status indication by emitting sound.

13. A vehicle (102) communication system as described in paragraph 1, wherein the mobile communication unit (122) is configured to provide the status indication by vibrating.

14. A method for facilitating communication between a vehicle (102) and a user comprising: providing a base station (104) positioned in the vehicle (102) and a mobile communication unit (122), the base station (104) comprising a first transmitter for transmitting a signal to the mobile communication unit (122) and a first receiver for receiving a signal from the mobile communication unit (122); receiving a subsystem status signal relating to performance of a monitored vehicle (102) function; determining, based on the subsystem status signal, a monitored function status relating to the monitored vehicle (102) function; transmitting a status update signal for receipt by the mobile communication unit (122), the status update signal being indicative of the monitored function status; and providing a status indication to a user based on the status update signal.

15. A method for facilitating communication between a vehicle (102) and a user as described in paragraph 14: further comprising receiving a request from the mobile communication unit (122), wherein the request seeks performance of a requested vehicle function comprising the monitored vehicle (102) function; wherein the status update signal is indicative of a status of the requested vehicle function.

16. A method for facilitating communication between a vehicle (102) and a user as described in paragraph 14, wherein the subsystem status signal is based on a position of the mobile communication unit (122) relative to the vehicle.

17. A method for facilitating communication between a vehicle (102) and a user as described in paragraph 15, wherein the performance of the requested vehicle function is based on a position of the mobile communication unit (100) relative to the vehicle.

18. A method for facilitating communication between a vehicle (102) and a user as described in paragraph 15, wherein the performance of the requested vehicle function is based on an absolute location of the vehicle.

19. A method for facilitating communication between a vehicle (102) and a user as described in paragraph 18, wherein the absolute location of the vehicle is based on a global positioning system.

20. A method for facilitating communication between a vehicle (102) and a user as described in paragraph 15, wherein the requested vehicle function comprises locking a vehicle aperture.

21. A method for facilitating communication between a vehicle (102) and a user as described in paragraph 15, wherein the requested vehicle function comprises closing a vehicle aperture.

22. A method for facilitating communication between a vehicle (102) and a user as described in paragraph 15, wherein the requested vehicle function comprises starting a vehicle engine.

23. A method for facilitating communication between a vehicle (102) and a user as described in paragraph 15, wherein the requested vehicle function comprises controlling a vehicle lighting system.

24. A method for facilitating communication between a vehicle (102) and a user as described in paragraph 14, wherein said providing a status indication comprises emitting light.

25. A method for facilitating communication between a vehicle (102) and a user as described in paragraph 14, wherein said providing a status indication comprises emitting sound.

26. A method for facilitating communication between a vehicle (102) and a user as described in paragraph 14, wherein said providing a status indication comprises vibrating.

27. A vehicle having a vehicle communication system, or being adapted to perform a method, as described in paragraph 1 or 14.

The invention claimed is:

1. A vehicle communication system for facilitating control over a function of a vehicle, the vehicle communication system comprising:
   a base station positioned in the vehicle;
   one or more transmitters and a plurality of receivers positioned in the vehicle; and
   a mobile communication unit;
   wherein the base station is configured to:
      track a position of the mobile communication unit in a three-dimensional space around the vehicle based on a time of flight of a communication between the mobile communication unit and the plurality of receivers;
      receive a subsystem status signal relating to performance of a monitored vehicle function;
      determine, based on the subsystem status signal, a monitored function status relating to the monitored vehicle function;
      output a status update signal, the status update signal being indicative of the monitored function status; and
      receive a request from the mobile communication unit, wherein the request seeks performance of a requested vehicle function comprising the monitored vehicle function, wherein the performance of the requested vehicle function is based on a position of the mobile communication unit in the three-dimensional space relative to an authorization zone of the vehicle;
   wherein the vehicle communication system is configured to provide a status indication to a user based on the status update signal in dependence on the position of the mobile communication unit in the three-dimensional space, and wherein the status update signal is indicative of a status of the requested vehicle function.

2. The vehicle communication system of claim 1, wherein the base station is configured to provide a status indication to a user based on the status update signal.

3. The vehicle communication system of claim 1, wherein the base station is configured to transmit the status update signal for receipt by the mobile communication unit, and wherein the mobile communication unit is configured to:
   receive the status update signal; and
   provide a status indication to a user based on the status update signal.

4. The vehicle communication system of claim 1, wherein the subsystem status signal is based on a position of the mobile communication unit relative to the vehicle.

5. The vehicle communication system of claim 1, wherein the performance of the requested vehicle function is based on an absolute location of the vehicle.

6. The vehicle communication system of claim 5, wherein the absolute location of the vehicle is based on a global positioning system.

7. The vehicle communication system of claim 1, wherein the requested vehicle function comprises one or more of: locking a vehicle aperture, closing a vehicle aperture, starting a vehicle engine, and controlling a vehicle lighting system.

8. The vehicle communication system of claim 2, wherein the base station is configured to provide the status indication by causing the vehicle to emit light and/or sound.

9. The vehicle communication system of claim 3, wherein the mobile communication unit is configured to provide the status indication by one or more of: emitting light, emitting sound, and vibrating.

10. A method for facilitating communication between a vehicle and a user, the method comprising:
   tracking a position of a mobile communication unit in a three-dimensional space around the vehicle based on a time of flight of a communication between the mobile communication unit and a plurality of receivers positioned in the vehicle;
   receiving a subsystem status signal relating to performance of a monitored vehicle function;
   determining, based on the subsystem status signal, a monitored function status relating to the monitored vehicle function;
   outputting a status update signal, the status update signal being indicative of the monitored function status;
   receiving a request from the mobile communication unit, wherein the request seeks performance of a requested vehicle function comprising the monitored vehicle function, wherein the performance of the requested vehicle function is based on a position of the mobile communication unit in the three-dimensional space relative to an authorization zone of the vehicle; and
   providing a status indication to a user based on the status update signal in dependence on the position of the mobile communication unit, wherein the status update signal is indicative of a status of the requested vehicle function.

11. The method of claim 10, further comprising transmitting the status update signal for receipt by the mobile communication unit.

12. The method of claim 10, wherein the requested vehicle function comprises one or more of: locking a vehicle aperture, closing a vehicle aperture, starting a vehicle engine, and controlling a vehicle lighting system.

13. A vehicle configured to perform the method of claim 10.

14. A vehicle comprising the vehicle communication system of claim 1.

* * * * *

UNITED STATES PATENT AND TRADEMARK OFFICE
CERTIFICATE OF CORRECTION

Page 1 of 1

PATENT NO. : 9,764,713 B2
APPLICATION NO. : 14/894528
DATED : September 19, 2017
INVENTOR(S) : Siswick et al.

It is certified that error appears in the above-identified patent and that said Letters Patent is hereby corrected as shown below:

On the Title Page

Page 2, Column 2:

Item (56) References Cited, Foreign Patent Documents:

Please correct "GB 2496755 A 6/2013" to read -- GB 2496755 A 5/2013 --

Please correct "JP 2006-009200 A 1/2005" to read -- JP 2005-009200 A 1/2005 --

Please correct "JP 2013-044887 A 3/2013" to read -- JP 2013-044687 A 3/2013 --

Signed and Sealed this
First Day of May, 2018

Andrei Iancu
*Director of the United States Patent and Trademark Office*